(12) United States Patent
Lin (10) Patent No.: US 9,465,798 B2
(45) Date of Patent: Oct. 11, 2016

(54) SINGLE WORD AND MULTI-WORD TERM INTEGRATING SYSTEM AND A METHOD THEREOF

(75) Inventor: John Lin, Taipei County (TW)

(73) Assignee: IQ TECHNOLOGY INC., Taipei County (TW)

( * ) Notice: Subject to any disclaimer, the term of this patent is extended or adjusted under 35 U.S.C. 154(b) by 108 days.

(21) Appl. No.: 12/900,694

(22) Filed: Oct. 8, 2010

(65) Prior Publication Data

US 2012/0089907 A1   Apr. 12, 2012

(51) Int. Cl.
  *G06F 17/21* (2006.01)
  *G06F 3/02* (2006.01)
  *G06F 17/28* (2006.01)
  *G06F 3/023* (2006.01)

(52) U.S. Cl.
  CPC ......... *G06F 17/2863* (2013.01); *G06F 3/0233* (2013.01); *G06F 3/0237* (2013.01)

(58) Field of Classification Search
  CPC .... G06F 3/0237; G06F 3/018; G06F 3/0233; G06F 17/2775; G06F 17/273; G06F 3/02; G06F 3/04897
  USPC ......................................... 715/254, 261, 264
  See application file for complete search history.

(56) References Cited

U.S. PATENT DOCUMENTS

| | | | | |
|---|---|---|---|---|
| 7,395,203 | B2 * | 7/2008 | Wu et al. | 704/235 |
| 8,028,230 | B2 * | 9/2011 | Hong | 715/264 |
| 8,095,364 | B2 * | 1/2012 | Longe et al. | 704/257 |
| 8,103,499 | B2 * | 1/2012 | Lai | G06F 3/018 715/262 |
| 2003/0023426 | A1 * | 1/2003 | Pun et al. | 704/9 |
| 2005/0027534 | A1 * | 2/2005 | Meurs et al. | 704/270 |
| 2005/0044495 | A1 * | 2/2005 | Lee et al. | 715/533 |
| 2006/0074661 | A1 * | 4/2006 | Takaichi | G10L 15/22 704/252 |
| 2006/0293889 | A1 * | 12/2006 | Kiss et al. | 704/235 |
| 2008/0141125 | A1 * | 6/2008 | Ghassabian | 715/261 |
| 2009/0281788 | A1 * | 11/2009 | Elizarov | G06F 17/28 715/261 |
| 2010/0167244 | A1 * | 7/2010 | Su | 434/157 |
| 2010/0231523 | A1 * | 9/2010 | Chou | 715/773 |

OTHER PUBLICATIONS

Duane K. Fields et al., "What's New in IntelliJ IDEA 5.0," Nov. 24, 2005, JetBRAINS, pp. 1-9.*

* cited by examiner

*Primary Examiner* — Ariel Mercado
(74) *Attorney, Agent, or Firm* — Min-Lee Teng; Litron Patent & Trademark Office (57) ABSTRACT

A single word and multi-word term integrating system and a method thereof are disclosed, wherein a user uses an input unit to continuously input pinying codes for the system to find combinations of the pinying codes to provide word candidates for the user to choose, wherein the word candidates can be combined into a phrase or a sentence; when the inputted pinying codes are too long or incomplete, there might be a false prediction of a word or a sentence due to an incorrect combination of pinying codes; consequently, the system forcibly determines the pinying codes to be regarded as a single word and does not combine them with the follow-up pinying codes; then the system uses a full sentence prediction result display unit for the user to choose a correct word, thereby improving prediction accuracy.

5 Claims, 9 Drawing Sheets

|  | 今天 的 讀書會主題 JT   DDSHHZHT |  |
|---|---|---|
| AB | DEF | GHI |
| JKL | MN | PQ |
| STU | VW | YZ |

*Fig. 3A*

|  | 今天 的 讀書會主題 JT   D DSHHZHT |  |
|---|---|---|
| AB | DEF | GHI |
| JKL | MN | PQ |
| STU | VW | YZ |

*Fig. 3B*

|  今天的 讀書會主題  |||
|:-:|:-:|:-:|
| JTD DSHHZHT |||
| AB | DEF | GHI |
| JKL | MN | PQ |
| STU | VW | YZ |

*Fig. 3C*

|  今天的讀書 會主題  |||
|:-:|:-:|:-:|
| JTDDSH HZHT |||
| AB | DEF | GHI |
| JKL | MN | PQ |
| STU | VW | YZ |

*Fig. 3D*

|  今天的讀書會 主題  |||
| :---: | :---: | :---: |
| JTDDSH    H ZHT |||
| AB | DEF | GHI |
| JKL | MN | PQ |
| STU | VW | YZ |

*Fig. 3E*

|  今天的讀書會 主題  |||
| :---: | :---: | :---: |
| JTDDSHH    ZHT |||
| AB | DEF | GHI |
| JKL | MN | PQ |
| STU | VW | YZ |

*Fig. 3F*

| 今天的讀書會主題 |||
|:---:|:---:|:---:|
| AB | DEF | GHI |
| JKL | MN | PQ |
| STU | VW | YZ |

*Fig. 3G*

| 今天的電視 機 維修 |||
| ㄐㄊㄅㄅㄕ ㄐ ㄨㄒ |||
|---|---|---|
| ㄅㄆㄇㄈ | ㄉㄊㄋㄌ | ㄍㄎㄏ |
| ㄐㄑㄒ | ㄓㄔㄕㄖ | ㄗㄘㄙ |
| ㄚㄛㄜㄝ | ㄞㄟㄠㄡ | ㄢㄣㄤㄥㄦ |
| | ㄧㄨㄩ | |

*Fig. 4A*

| 今天　的　電視機維修 |||
| ㄐㄊ　ㄅ　ㄅㄕㄐㄨㄒ |||
|---|---|---|
| ㄅㄆㄇㄈ | ㄉㄊㄋㄌ | ㄍㄎㄏ |
| ㄐㄑㄒ | ㄓㄔㄕㄖ | ㄗㄘㄙ |
| ㄚㄛㄜㄝ | ㄞㄟㄠㄡ | ㄢㄣㄤㄥㄦ |
| | ㄧㄨㄩ | |

*Fig. 4B*

|  今天的　電視機維修  ||  |
|---|---|---|
|  ㄐㄊㄅ　ㄅㄕㄐㄨㄒ  |||
| ㄅㄆㄇㄈ | ㄉㄊㄋㄌ | ㄍㄎㄏ |
| ㄐㄑㄒ | ㄓㄔㄕㄖ | ㄗㄘㄙ |
| ㄚㄛㄜㄝ | ㄞㄟㄠㄡ | ㄢㄣㄤㄥㄦ |
|  | ㄧㄨㄩ |  |

*Fig. 4C*

|  今天的電視　機維修  ||  |
|---|---|---|
|  ㄐㄊㄅㄅㄕ　ㄐㄨㄒ  |||
| ㄅㄆㄇㄈ | ㄉㄊㄋㄌ | ㄍㄎㄏ |
| ㄐㄑㄒ | ㄓㄔㄕㄖ | ㄗㄘㄙ |
| ㄚㄛㄜㄝ | ㄞㄟㄠㄡ | ㄢㄣㄤㄥㄦ |
|  | ㄧㄨㄩ |  |

*Fig. 4D*

|         今天的電視 機 維修         |         |         |
|:---:|:---:|:---:|
|         ㄐㄊㄅㄅㄕ ㄐ ㄨㄒ         |         |         |
| ㄅㄆㄇㄈ | ㄉㄊㄋㄌ | ㄍㄎㄏ |
| ㄐㄑㄒ | ㄓㄔㄕㄖ | ㄗㄘㄙ |
| ㄚㄛㄜㄝ | ㄞㄟㄠㄡ | ㄢㄣㄤㄥㄦ |

|  |  ㄧㄨㄩ  |  |
|:---:|:---:|:---:|

*Fig. 4E*

|         今天的電視機 維修         |         |         |
|:---:|:---:|:---:|
|         ㄐㄊㄅㄅㄕㄐ ㄨㄒ         |         |         |
| ㄅㄆㄇㄈ | ㄉㄊㄋㄌ | ㄍㄎㄏ |
| ㄐㄑㄒ | ㄓㄔㄕㄖ | ㄗㄘㄙ |
| ㄚㄛㄜㄝ | ㄞㄟㄠㄡ | ㄢㄣㄤㄥㄦ |

|  |  ㄧㄨㄩ  |  |
|:---:|:---:|:---:|

*Fig. 4F*

SINGLE WORD AND MULTI-WORD TERM INTEGRATING SYSTEM AND A METHOD THEREOF

BACKGROUND OF THE INVENTION

1. Field of the Invention

The present invention provides a single word and multi-word term integrating system and a method thereof for quickly modifying false predictions of input method editors (IME) for Chinese, English or other languages and for improving prediction accuracy.

2. Description of the Prior Art

As mobile devices prevail, it is more often for users to use mobile devices to input texts to desired applications; therefore, various input method editors (IMEs) have been developed to help users improve their input speed.

For example, many Chinese IMEs are based on pronunciations, such as Zuyin (or Zuying, which uses phonetic symbols), wherein one phonetic symbol corresponds to one key. When the user wants to input a word, he/she can input the phonetic symbols according to phonetic order of the word. The advantages of using phonetic symbols are: the user doesn't need to know the radicals for a specific word and can input the phonetic symbols as long as he/she can pronounce the word, thereby providing an easy and simple input mechanism; however, the disadvantages are: the user cannot input a word which he/she doesn't know how to pronounce, there could be many homophones for each word, making it time consuming in choosing a correct word. Therefore, an IME using first few codes of the Zuyin IME has been proposed to solve the above problems; however, there could be too many word candidates (maybe pages of words) generated during the inputting process if fewer inputted codes are inputted, making it also time consuming in choosing a correct word.

In order to solve the problem, a new IME based on Pinying (or Pinyin), which is called Intelligent IME, has been proposed, in which the pronunciation of a Chinese word (or character) is corresponded with an English letter with a similar pronunciation; therefore, the user inputs a sentence by using one letter to correspond to one word, while a string of letters represents the sentence. Thereafter, the system automatically determines the sentence by using these inputted letters. However, the system often fails to identify a single word and provides incorrect combination of words since a Chinese sentence is consisted of single words and multi-word terms; therefore, it could take more time for the user to choose the correct words from the word candidates.

In view of the deficiencies of the prior art techniques, after years of constant researches, the inventor has successfully proposed a single word and multi-word term integrating system and a method thereof in the present invention.

SUMMARY OF THE INVENTION

It is an object of the present invention to provide a single word and multi-word term integrating system and a method thereof, which can predict certain phonetic symbols to be regarded as a single word and not to combine them with succeeding phonetic symbols, thereby reducing the probability of false prediction.

It is another object of the present invention to provide a single word and multi-word term integrating system and a method thereof, when the system determines certain phonetic symbols to be regarded as a single word, it moves a select cursor to the position between the certain phonetic symbols and its succeeding phonetic symbols to provide a fast way for the user to choose the desired word or phrase.

In order to achieve the above objects, the present invention discloses a single word and multi-word term integrating system and a method thereof, which mainly comprises an input unit having a keyboard or other software/hardware device worked as a substitute of the keyboard for a user to continuously input phonetic symbols, wherein the phonetic symbols could be first codes of words or complete phonetic symbols of a word, then the phonetic symbols are displayed in a pinying input display unit for the system to use a full sentence prediction unit to find combinations of the phonetic symbols and to predict corresponding words, which can be further combined into a specific phrase or a sentence to be shown in a full sentence prediction result display unit; when the user continuously inputs a string of phonetic symbols or incomplete phonetic symbols, the full sentence prediction unit could make incorrect prediction of the combination of phonetic symbols, at this time a single word prediction unit can be used to forcibly determine the inputted phonetic symbols to be regarded as a single word and not to combine the phonetic symbols of the single word with succeeding phonetic symbols, and then displays the single word in a single word prediction result display unit, while the succeeding phonetic symbols will be used by the full sentence prediction unit and the full sentence prediction result display unit for combining, predicting, and displaying the phonetic symbols; therefore, the user uses the input unit and the pinying input display unit to choose the correct word or phrase until a final sentence is done, wherein the final sentence is sent to a target, which can be an application or a software component for accepting text input. Therefore, the present invention can improve prediction accuracy and enhance input efficiency.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
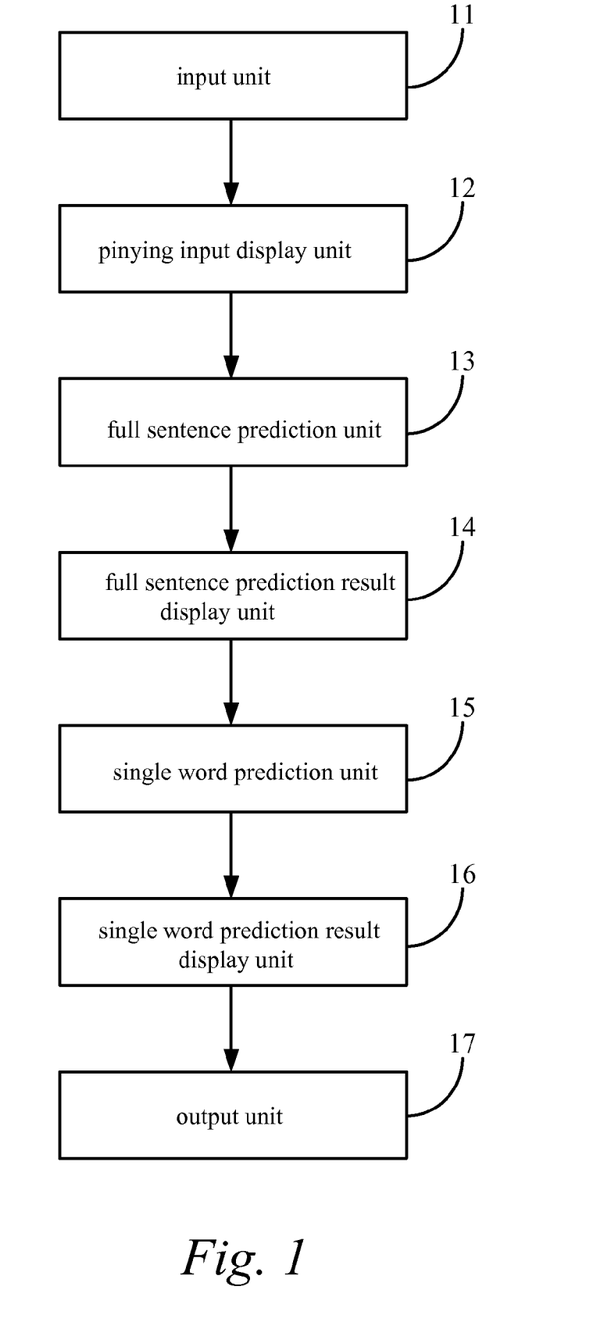
FIG. 1 illustrates a structural view of a single word and multi-word term integrating system in the present invention.

Please refer to FIG. 1 for a structural view of a single word and multi-word term integrating system and a method thereof, which comprises:

an input unit 11 for connecting with an input interface of a mobile communication device or other computer devices, the input unit 11 using a keyboard or other software/hardware device worked as a substitute of the keyboard for a user to continuously input pinying or zhuyin codes and display the input result on a pinying input display unit 12;

a full sentence prediction unit 13 for combining the inputted pinying or zhuyin codes from the input unit 11 into a corresponding word, phrase or sentence; a full sentence prediction result display unit 14 displaying a result of the full sentence prediction unit for the user to verify and choose a correct word, phrase or sentence;

a single word prediction unit 15, while the full sentence prediction unit could make incorrect prediction of the combination of pinying or zhuying codes, at this time a single word prediction unit can be used to forcibly determine the inputted pinying codes to be regarded as a single word and to make it as a word candidate with high priority and not to combine the pinying codes of the single words with succeeding pinying codes, and then displays the single word in a single word prediction result display unit 16, while the succeeding pinying codes will be used by the full sentence prediction unit 13 and the full sentence prediction result display unit 14 for combining, predicting, and displaying the pinying codes; therefore the user can use the input unit 11 and the pinying input display unit 12 to choose the correct word or phrase until a final sentence is made;

an output unit 17 displaying the chosen sentence to a target, which can be an application or a software component which can accept text input.

Figure 2:
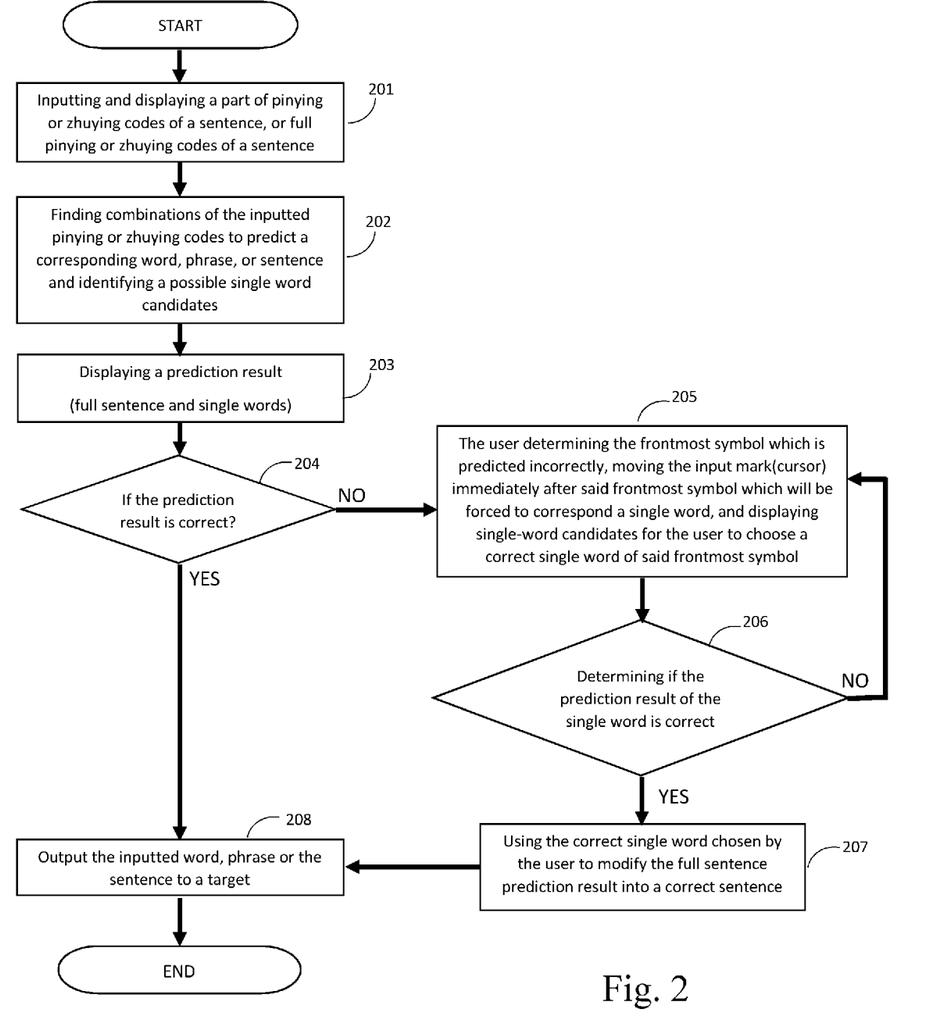
FIG. 2 illustrates a flowchart of a single word and multi-word term integrating method in the present invention.

Please refer to FIG. 2 for a flowchart of a single word and multi-word term integrating method in the present invention, which comprises:

Step 201: inputting a part of pinying or zhuying codes of a sentence, or full pinying or zhuying codes of a sentence and displaying the inputted pinying or zhuying codes;

Step 202: finding combinations of the inputted pinying or zhuying codes, which are not yet recognized, to predict a corresponding word, phrase or sentence, and identifying possible word candidates;

Step 203: displaying a prediction result with word candidates of step 202;

Step 204: the user determining if the prediction result is correct; if so, then going to step 208, if not, then going to step 205;

Step 205: the user determining the frontmost symbol which is predicted incorrectly, moving the input mark (cursor) immediately after said frontmost symbol which will be forced to correspond a single word, and displaying single-word candidates for the user to choose a correct single word of said frontmost symbol;

Step 206: the user determining if the prediction result of the single word is correct; if not, then going back to step 205 to continue moving an input mark (cursor) to the single word or choosing follow-up single word (since a sentence could be consisted of a lot of single words and multi-word terms) and determining if the corresponding sentence is correct, if so, then going to step 207;

Step 207: using the correct single word chosen by the user to modify the full sentence prediction result into a correct sentence for the user to make final verification;

Step 208: outputting the inputted word, phrase, or the sentence to a target, such as an application or a software component which can accept text input and ending the process.

Figure 3A:
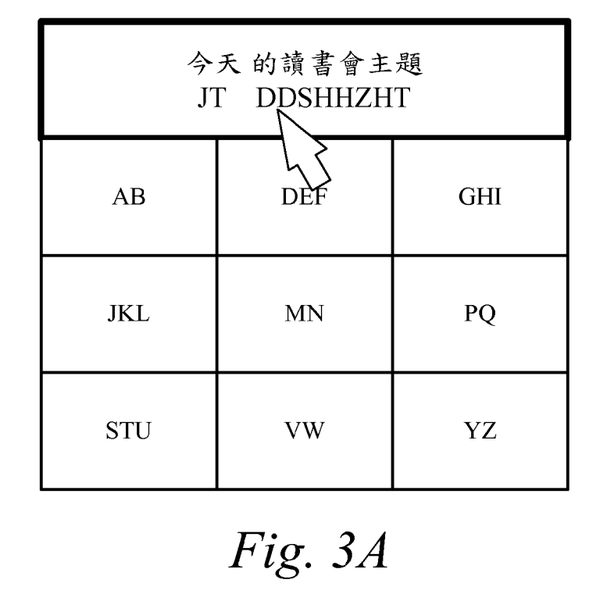
FIG. 3A to FIG. 3G illustrate embodiment views of a single word and multi-word term integrating method in the present invention.

Please refer to FIG. 3A to FIG. 3G for embodiment views of the method for combining a single word and a multi-word term in the present invention;

When the user wants to get the following Chinese sentence:

"今天的讀書會主題" (JinTienDeDuShuHueiZhuTi, which means "The subject of the study group for today"), he or she needs to type:

JTDDSHZT

The first two symbols "JT" is recognized as "今天", but the target single word "的" is not recognized.

Figure 3B:
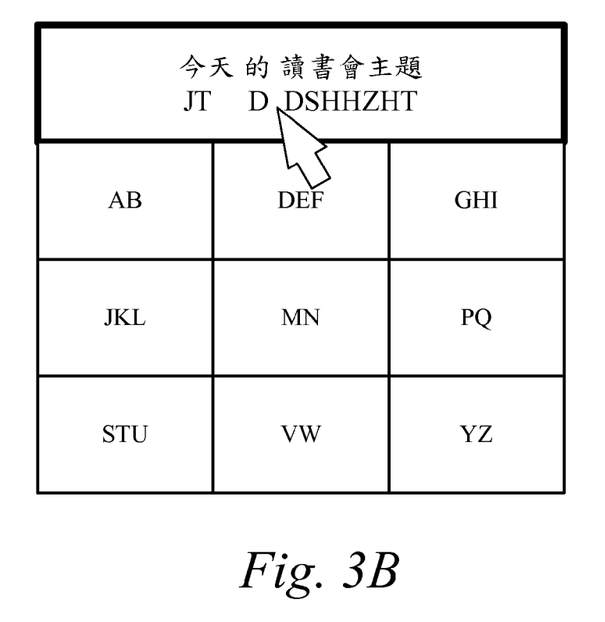

In this stage, the candidate words of the rest symbols "DDS . . . " could be multi-word terms such as: "人多數/人都市/得到　/達到 . . . " (DaDuoShu/DaDuShi/DeDao/DaDao), which are not single words. Therefore, the present invention forcibly determines the inputted codes to be regarded as a single word by indicating the starting symbol, "D", of the series of symbols "DDS" to identify the word that the starting symbol, "D", represents, such as by moving the cursor to the position between pinying codes "D" and "D", so the target words and the inputted codes could be read as:

"　　今天　的 讀書會主題"

JT D←DSHZT

Figure 3C:
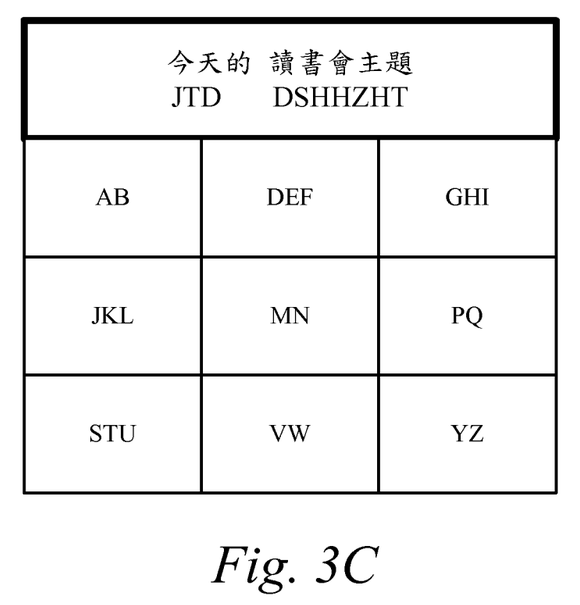

And the symbol "D" now could be a single word such as: "大/對/到/地/..." (Da/Duei/Dao/Di . . . ) with De ("的") falling very far behind, then the user can input pinyin symbol "e" to combine with the symbol "D" to limit the candidate words to "的/得/德" (all pronounced De). Thereafter, the user chooses "的" (De) to finish part of the sentence, and the multi-word term "今天的" (JinTien De) is recorded, that is, the prediction result of "JTD" is confirmed by the user and thereby recognized, wherein the operation is shown as:

"今天的← 讀書會主題"

JTD DSHZT

Figure 3D:
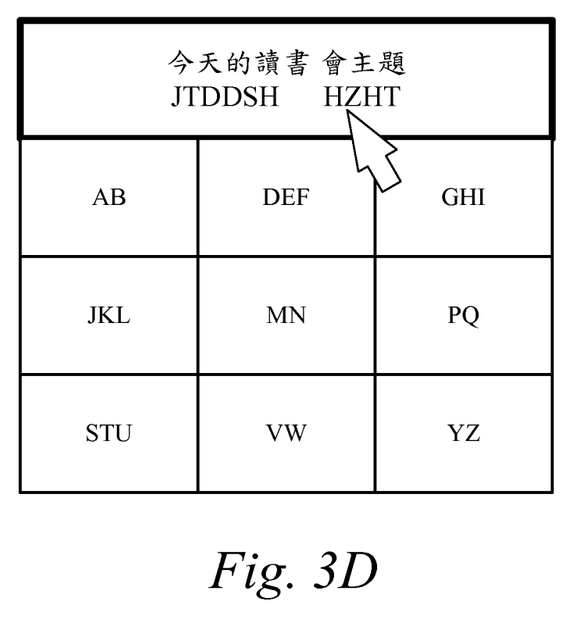

Then, as the candidate words of the rest symbols "DSHZT" show: "董事會/到時候/讀　書 . . . " (DongShiHuei/aoShiHou/DuShu), while "讀書會" (DuShuHuei) is not shown in the list; when the candidate words "讀書" (DuShu) are chosen, the sentence is shown as:

"今天的讀書　會主題"

JTDDS HZT

Figure 3E:
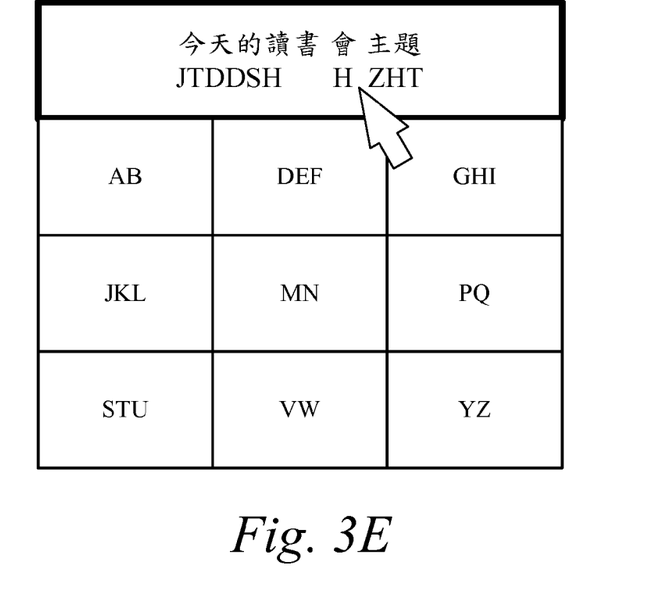

Then, as the candidate words of the rest symbols "HZT" show: "或者/杭州/患者 . . . " (HuoZhe/HungZho/HuangZe), at this time, the user could click on a key to forcibly determine the inputted codes of "會主題" to be regarded as a single word and to move the cursor between the pinying codes "H" and "Z", so the sentence is now shown as:

"今天的讀書　會←主題"

JTDDS H←ZT

Figure 3F:
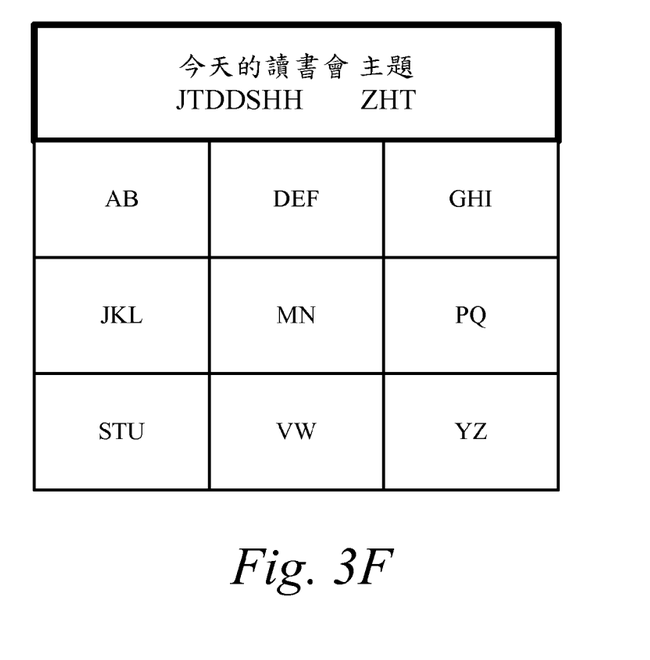

As candidate words of "H" show single words such as: "和/還/行/後 . . . " (Han/Hai/Hung/Hou, while Huei falling very far behind), now the user can input pinyin symbols "uei" to combine with "H" to limit the candidate words to "會/回/揮" (all pronounced Huei). Thereafter, the user chooses "會" (Huei) and the multi-word term "讀書會" (DuShuHuei) is recorded, that is, the prediction result of "DSH" is confirmed by the user and thereby recognized, wherein the sentence is now shown as:

"今天的讀書會　主題"

JTDDSH ZT

Figure 3G:
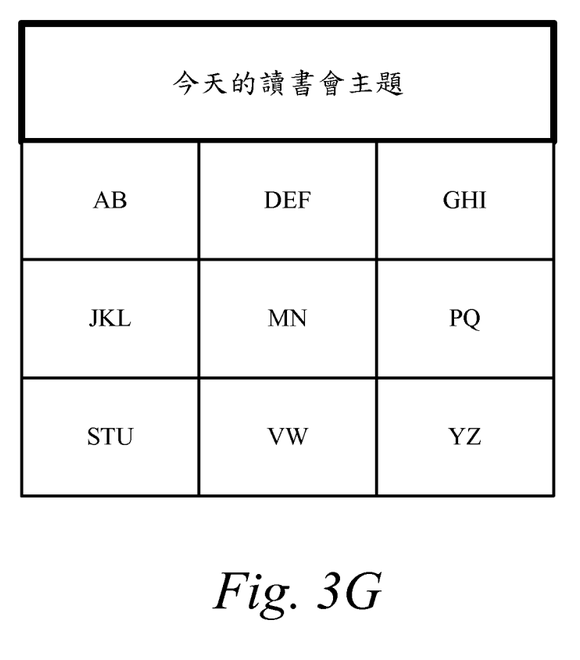

Now the candidate words of the rest symbols "ZT" show "主題/狀態/專題" (ZhuTi/ZhaunTai/ZhuanTi); thereafter, the multi-word term "主題" (ZhuTi) is chosen to finish the text and sentence input wherein the final sentence sent to the target is now shown as : "今天的讀書會主題" (JinTienDeDuShuHueiZhuTi).

Therefore, whenever a series of phonetic symbols, which can be a portion of the whole inputted symbols, are not recognized as a phase or a sentence, the starting phonetic symbol of the series of phonetic symbols is indicated to identify the word that the starting phonetic symbol represents, and then the rest of the phonetic symbols in the series of phonetic symbols are converted into corresponding words.

Figure 4A:
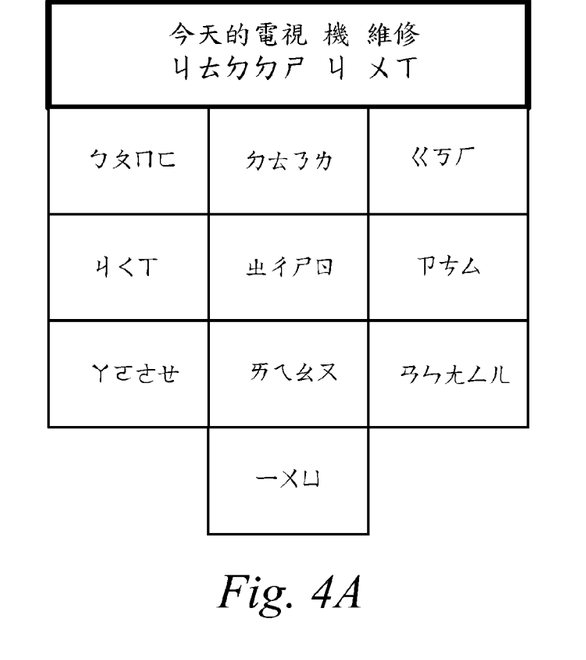
FIG. 4A to FIG. 4F illustrate embodiment views of a single word and multi-word term integrating method using phonetic symbols in the present invention.

Please refer to FIG. 4A to FIG. 4F for embodiment views of a single word and multi-word term integrating method using phonetic symbols in the present invention; in which:

When the user wants to input the following sentence:

"今天的電視機維修" (ㄐㄧㄣ ㄊㄧㄢ ㄉㄜˋ ㄉㄧㄢˋ ㄕˋ ㄐㄧ ㄨㄟˊ ㄒㄧㄡ, GinTien DeDienShiGi-WeiShiu, which means "The TV maintenance for today")

ㄐㄊ ㄉㄉㄕㄐㄨㄒ (GT DDSGWS)

The first two symbols "ㄐㄊ" (GT) have been recognized as "今天".

Figure 4B:
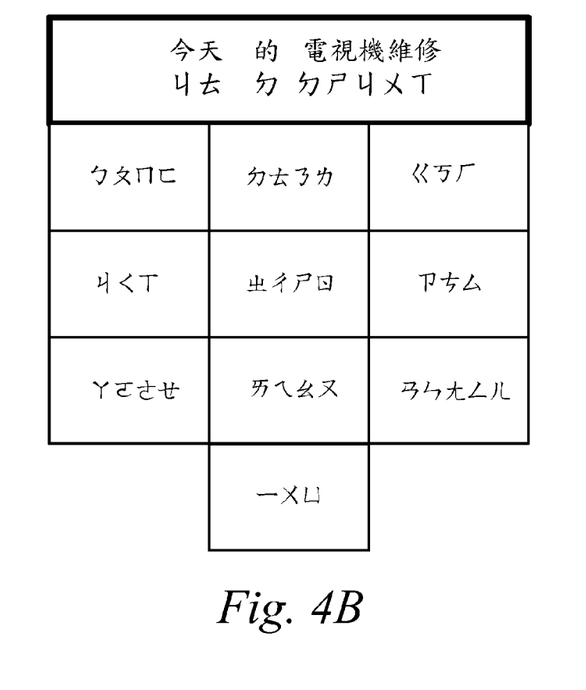

As candidate words of the rest symbols "ㄉㄉㄕㄐㄨㄒ" (DDSGWS) show multi-word terms such as: "地點/大地/得到/訂定 . . ." (ㄉㄧˋ ㄉㄧㄢˇ/ㄉㄚˋ/ㄉㄧˋ/ㄉㄜˊ ㄉㄠˋ/ㄉㄧㄥˋ ㄉㄧㄥˋ, DiDien/DaDi/DeDao/DingDin) and no single word, at this time the single word identification mechanism is used first to find a single word, a cursor is moved to between the zhuying codes "ㄉ" (D) and "ㄉ" (D), then an arrow would appear in the figure to remind the user to make modifications, at this time the input codes are shown as:

"今天 的 ← 電視機維修" (GinTien De←DienShiGi-WeiShiu)

ㄐㄊ ㄉ ㄉㄕㄐㄨㄒ (GT D DSGWS)

Figure 4C:
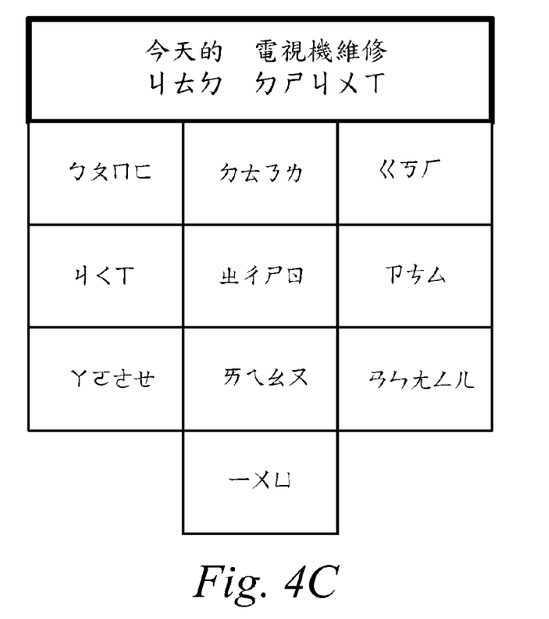

As candidate words of "ㄉ" show: "/得/對/到" (ㄉㄜˊ/ㄉㄨㄟˋ/ㄉㄠˋ, De/Duei/Dao) with "的" (ㄉㄜ˙, De) falling far behind; at this time the user can input zhuying symbol "ㄜ" to combine with the "ㄉ" to limit the candidate words to single words such as "的/得/ 德 . . ." (all pronounced ㄉㄜ, De); then the user can choose "的" (ㄉㄜ˙, De) to finish part of the sentence and have "今天的" (ㄐㄊㄉ, GTD) shown as a multi-word term, that is, the prediction result of "ㄐㄊㄉ" (GTD) is confirmed by the user; therefore, the sentence is now shown as:

"今天的 電視機維修" (GinTien DienShiGiWeiShiu)

ㄐㄊㄉ ㄉㄕㄐㄨㄒ (GTD DSGWS)

Figure 4D:
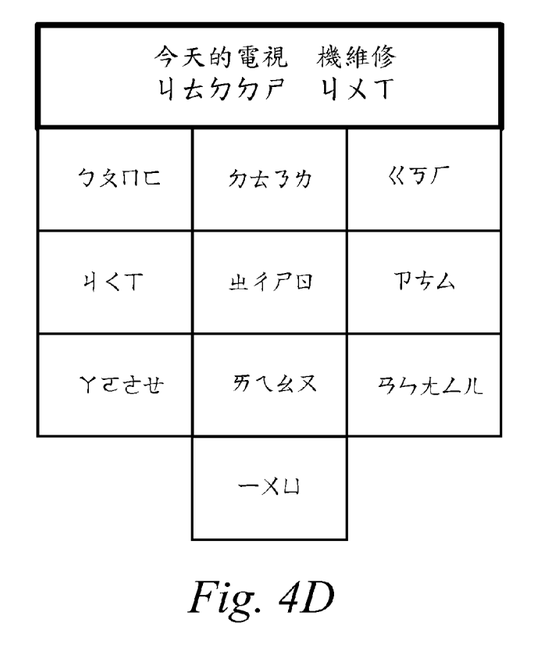

As the candidate words of the rest symbols "ㄉㄕㄐㄨㄒ" show phrases such as: "電視 /電視劇/短時 間/大世界/ . . ." (ㄉㄧㄢˋ ㄕˋ/ㄉㄧㄢˋ ㄕˋ ㄐㄩˋ/ㄉㄨㄢˇ ㄕˊ ㄐㄧㄢ/ㄉㄚˋ ㄕˋ ㄐㄧㄝˋ, DienShi/DienShiGi/DaShiGie, while "電視機" (DienShiGi) is not shown), the user chooses "電視" (ㄉㄕ, DS); therefore, the sentence is now shown as:

"今天的電視 機維修" (GinTien DeDienShi GiWeiShiu)

ㄐㄊㄉㄉㄕ ㄐㄨㄒ (GTDDS GWS)

Figure 4E:
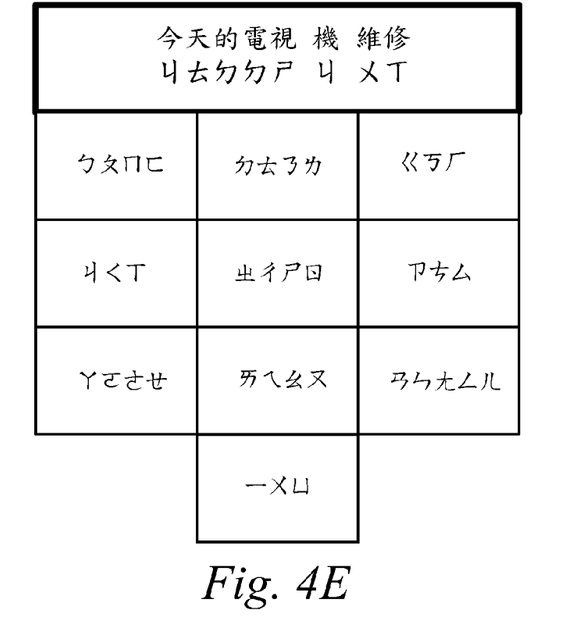

As the candidate words of the rest symbols "ㄐㄨㄒ" show: "今晚/家務/絕無 . . ." (ㄐㄧㄣ ㄨㄢˇ/ㄐㄧㄚ ㄨˋ/ㄐㄩㄝˊ ㄨˊ, GiWang/GiaWu/GieWu), the user now can click on a key to forcibly determine the inputted codes of " 機維修 " to be regarded as a single word and to move the cursor between the zhuying codes "ㄐ (G)" and "ㄨㄒ (WS)", the user can see an arrow appear in the figure to remind him/her to make modification, so the sentence is now shown as:

"今天的電視 機 ←維修" (GTDDS G←WS)

ㄐㄊㄉㄉㄕ ㄐ ㄨㄒ (GTDDS G WS)

Figure 4F:
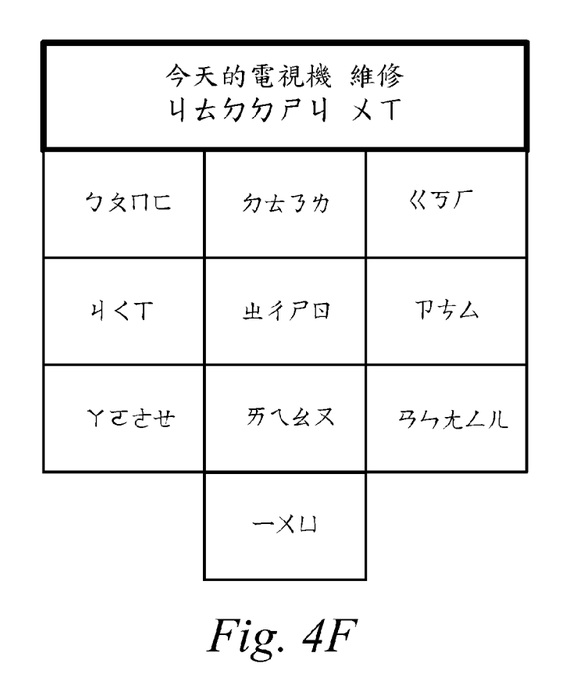

As the candidate words of "ㄐ" show: "經/金/家/進 . . ." (ㄐㄧㄥ/ㄐㄧㄣ/ㄐㄧㄚ/ㄐㄧㄣˋ, Gin/Ging/Gia/Gin) with "機" (ㄐㄧ, Gi) falling far behind, the user can input zhuying symbol "ㄧ" to combine with "ㄐ" to limit the candidate words to single words such as "機/基 /積 . . ." (all pronounced ㄐㄧ, Gi), then the user can choose " 機" (ㄐㄧ, Gi) to finish part of the sentence and have "電視機" (DienShiGi)

shown as a multi-word term, that is, the prediction result of "ㄉㄕㄐ" (DSG) is confirmed by the user and thereby recognized; therefore, the sentence is now shown as:

"今天的電視機 維修" (GinTien DeDienShiGi WeiShiu)

ㄐㄊㄉㄉㄕㄐ ㄨㄒ (GTDDSG WS)

As now the candidate words of the rest symbols "ㄨㄒ" show: "無限/狀態/專題/維 修 . . ." (ㄨˊ ㄒㄧㄢˋ/ㄓㄨㄤˋ ㄊㄞˋ/ㄓㄨㄤˋ ㄊㄧˊ/ㄨㄟˊ ㄒㄧㄡ, WuShien/ZuangTai/ZuangTi/WeiShiu), the multi-word term "維修" (ㄨㄟˊ ㄒㄧㄡ, WeiShiu) is chosen to finish the text and sentence input; wherein the final sentence sent to the target is shown as: "今天的電視機維修" (GinTien DeDienShiGi WeiShiu).

The present invention provides a single word and multi-word term integrating system and a method thereof, while compared with other prior art techniques, is advantageous in:

1. The present invention provides a method for reducing the probability of false prediction due to incorrect combinations of long Pinying or Zhuying codes, thereby improving the text input speed.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method for inputting words for an electronic device having an input unit and an output unit, the method comprising the steps of:
   a. inputting a first series of symbols through the input device and displaying them on the output unit, wherein each of the first series of inputted symbols is a leading phonetic symbol of a pronunciation of a word, wherein each leading phonetic symbol respectively represents a single word, and wherein each of the first series of symbols is Pinyin type or Zhuyin type;
   b. generating a first prediction for converting the first series of inputted symbols into a first series of words of a phrase or sentence on the output unit, wherein the first series of words and the first series of inputted symbols have a one-to-one correspondence;
   c. if the first prediction is recognized as an incorrect phrase or sentence in step b, moving a cursor to the frontmost symbol that is predicted incorrectly in the first series of inputted symbols on the output unit and displaying single-word candidates for converting said frontmost symbol into a correct single Chinese word;
   d. according to the correct single Chinese word, generating a second prediction for converting symbols succeeding the said frontmost symbol in the first series of inputted symbols into a second series of words of a phrase or sentence on the output unit, wherein words of the first series of words corresponding to symbols in front of said frontmost symbol and said correct single word remain unchanged; and
   e. displaying a finished correct sentence, wherein the correct sentence includes a plurality of words, each represented by a corresponding inputted leading phonetic symbol.

2. The method for inputting words according to claim 1, wherein the cursor is located between the said frontmost symbol and the symbol succeeding the said frontmost symbol in the first series of symbols.

3. The method for inputting words according to claim 1, wherein the step c further comprises inputting a second symbol, wherein the second symbol is combined with the said frontmost symbol to generate said single-word candidates for choosing the correct single Chinese word.

4. The method for inputting words according to claim 3, wherein the step c further comprises inputting a third symbol, wherein the second symbol and the third symbol are combined with the said frontmost symbol to generate said single-word candidates for choosing the correct single Chinese word.

5. The method for inputting words according to claim 1, wherein step c further comprises pressing a pre-specified key to position the cursor between the said frontmost symbol and a second symbol next to the said frontmost symbol in the first series of inputted symbols.

* * * * *